(No Model.)
J. W. SIMMONS.
RUNNER FOR WHEELED VEHICLES.
No. 352,580. Patented Nov. 16, 1886.
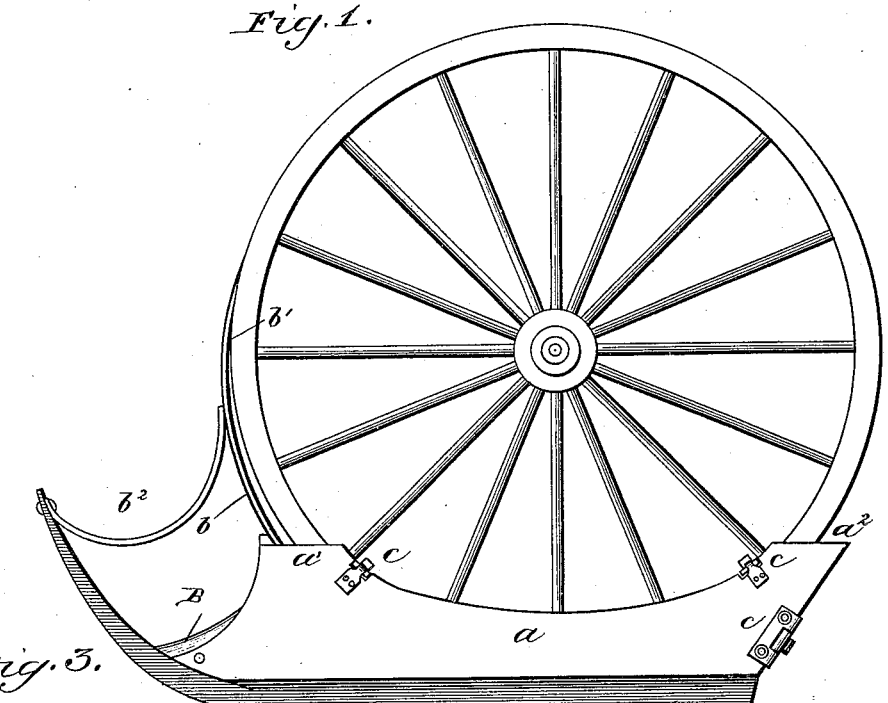
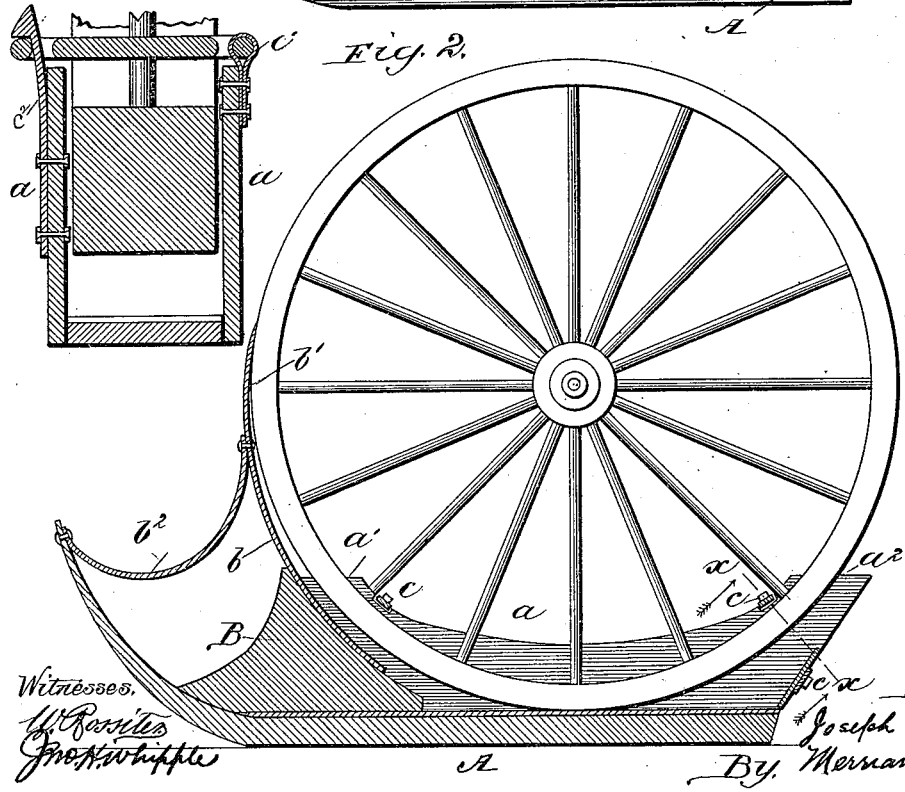

United States Patent Office.

JOSEPH W. SIMMONS, OF CHICAGO, ILLINOIS.

RUNNER FOR WHEELED VEHICLES.

SPECIFICATION forming part of Letters Patent No. 352,580, dated November 16, 1886.

Application filed August 12, 1886. Serial No. 210,066. (No model.)

*To all whom it may concern:*

Be it known that I, JOSEPH W. SIMMONS, of Chicago, in the State of Illinois, have invented certain new and useful Improvements in Detachable Runners for Wheeled Vehicles, of which the following is a specification.

My invention relates to improvements in detachable runners for wheeled vehicles designed to be attached to the wheels of wagons, carriages, &c., in winter when snow is on the ground, to enable the same to be run as a sled; and the objects of my improvements are, first, to provide such runners with means for affording a flexible connection with the wheel, and a spring in front to act as a cushion against which the wheel presses, whereby the runner may pass uneven places or obstructions in the roadway with less jar and strain upon the wheels; second, to provide means having automatic action for fastening such runners to the wheels; and, third, to provide guides at the rear of such runners to facilitate the placing of the same on the wheels, and when on to act as stays which tend to equalize the strain on the wheels when passing a curve in the roadway. I attain these objects by the means illustrated in the accompanying drawings, of which—

Figure 1 is a side view of a wheel with such runner attached. Fig. 2 shows a longitudinal section of the runner. Fig. 3 is an enlarged section taken on line $x\ x$ of Fig. 2.

The runner A is provided with flanges $a$ on each side, which are cut low in the center and higher at the front $a'$ and rear $a^2$. The felly of the wheel fits snugly between these flanges, so as to move in and out without rubbing and to afford slight lateral play. The flanges at the rear upper corners project a considerable distance back of the hind end of the runner. The space between the flanges in front is filled by a block, B, which prevents snow from getting between the flanges in front, and affords support for the lower end of a spring, $b$, which is extended up a little above the center of the wheel and comes in contact with the tire at a point, $b'$, at or about the horizontal center of the wheel, or slightly above it. This spring is braced and supported by a supplemental spring, $b^2$, attached to the upper front end of the runner at one end and to the main spring at the other, and curved down in the center so as to strengthen the latter spring.

Automatic spring-latches $c$ are provided for locking the runner to the wheels. These are hinged at $c'$ to the flange on one side, and the other has a spring-catch, $c^2$, which passes through an opening in the end of the latch and automatically catches and holds the latch down. By pressing the spring back the latch may be thrown back, so as to hang down on the outside of the flange to which it is hinged. I use three of these latches, two on the top of the flanges and one at the rear, down near the runner. This one is preferably made wider than the others and closes a considerable portion of the opening between the flanges from the runner up.

It will be seen that the runner thus constructed can be easily attached to a wagon or buggy without lifting the wheels. By placing the runners down upon the ground in front of the wheels, with the rear projecting portions of the flanges embracing the felly, they are prevented from turning over, and then by simply drawing the vehicle forward the wheels move up against the springs $b$. When this is done, the latches are turned over and lock automatically, and the attachment is complete without requiring the use of a wrench or other tools. The runners can be in like manner and as easily detached when desired.

The wheels simply rest on the top of the runners, and the draft is against the top of the spring in the plane of the axle. The tendency of the wheel to turn is thus prevented, except to the extent of the yield of the spring. The spring yields only slightly to obstructions or uneven places in the roadway, and allows the runners to pass them without so much jar and strain upon the wheel as would be incurred with a rigid attachment.

I am aware that various forms of detachable runners for wheeled vehicles have heretofore been made having various forms of rigid attachment to the wheel, as seen in Patent No. 294,136, of February 26, 1884, to Larkin, which shows a sleigh-runner having wedges to adapt the top of the runner to the curve of the wheel, in combination with screw-bolt clips, forming a rigid attachment; and in Patent No. 122,454, of January 2, 1872, to Gregg, which shows a shoe also having the top adapted to the curve of the wheel, with a clip over the felly clasping it firmly down; and also in Patent No. 159,327, of February 2, 1875, to Hyde, which shows hinged arms coming against the wheel both forward and back of the point where it rests on the runner. In all these cases and others which might be mentioned the top of the runner is fitted to the curve of the wheel and bound by clips, which prevent any forward movement of the wheel on the runner, and the neck or top of the runner is likewise bound by a clip drawing it and the felly toward each other at this point; but my invention differs from these in not having the top of the runner adapted to fit the curve of the wheel, but straight. The raised portions $a'$ $a^2$ of the flange prevent lateral displacement, and the automatic latches do not bind on the top of the felly, so that a yielding attachment is provided, by means of which the wheel is left free to move forward on the runner against the spring at the top to the extent of the yield of the spring in drawing the runner forward over an even way and in passing obstructions and inequalities.

What I claim is—

As an improvement in detachable runners for wheeled vehicles, the runner, as A, provided with flanges having the parts $a'$ $a^2$ adapted to rest against the sides of the felly, and spring $b$ and clamps $c$, all substantially as and for the purpose specified.

JOSEPH W. SIMMONS.

Witnesses:
 JNO. H. WHIPPLE,
 J. R. DEAN.